United States Patent
Gretz et al.

[19]

[11] Patent Number: 6,044,868

[45] Date of Patent: *Apr. 4, 2000

[54] WATERTIGHT FITTING FOR FLEXIBLE NON-METALLIC CONDUIT

[75] Inventors: Thomas J. Gretz, Clarks Summit, Pa.; Thomas S. Stark, Coral Springs, Fla.

[73] Assignee: Arlington Industries, Inc., Scranton, Pa.

[*] Notice: Under 35 U.S.C. 154(b), the term of this patent shall be extended for 610 days.

[21] Appl. No.: 08/681,070

[22] Filed: Jul. 22, 1996

Related U.S. Application Data

[63] Continuation of application No. 08/394,400, Feb. 24, 1995, abandoned.

[51] Int. Cl.⁷ .................................................. F16L 11/00
[52] U.S. Cl. ........................................... 138/109; 138/110
[58] Field of Search ................................ 138/109, 967, 138/89.1, 110; 285/11, 32, 92

[56] References Cited

U.S. PATENT DOCUMENTS

| | | | |
|---|---|---|---|
| 2,295,830 | 9/1942 | Carlson | 138/110 |
| 3,540,486 | 11/1970 | Flounders | 138/125 |
| 3,966,238 | 6/1976 | Washkewicz et al. | 138/125 |
| 3,992,044 | 11/1976 | Muslin | 285/92 |
| 4,133,312 | 1/1979 | Burd | 138/109 |
| 4,366,841 | 1/1983 | Currie et al. | 138/109 |
| 4,457,544 | 7/1984 | Snow et al. | 285/92 |
| 4,675,780 | 6/1987 | Barnes et al. | 138/109 |
| 4,850,620 | 7/1989 | Puls | 138/109 |
| 5,040,830 | 8/1991 | Atkinson | 138/109 |

FOREIGN PATENT DOCUMENTS

| | | | |
|---|---|---|---|
| 0249146 | 1/1961 | Australia | 138/109 |
| 0939423 | 10/1963 | United Kingdom | 138/109 |

*Primary Examiner*—James Hook

[57] ABSTRACT

An improved connector for attaching flexible non-metallic liquid tight conduit to electrical devices. The connector is attached to the conduit by a simple twisting action. The invention simplifies the connection task, is easily manufactured in a one piece molding operation, is cheaper to produce than other connectors on the market, creates a water tight fit, resists pull out forces, and does not require the use of a gasket to create a water tight seal.

4 Claims, 3 Drawing Sheets

WATERTIGHT FITTING FOR FLEXIBLE NON-METALLIC CONDUIT

This is a continuation of application Ser. No. 08/394,400 filed on Feb. 24, 1995 now abandoned.

FIELD OF THE INVENTION

This invention relates to devices for connecting flexible non-metallic conduit to electrical panels or boxes and specifically to a much improved connector that simplifies the connection task, is easily manufactured in a one piece molding operation, is cheaper to produce than other connectors on the market, creates a water tight fit, resists pull out forces, and does not require the use of a gasket to create a water tight seal.

BACKGROUND OF THE INVENTION

Previously most of the liquid tight conduit manufactured and sold was the metal type which had a coiled steel spiral inside and a plastic jacket on the outside which made it liquid tight. As the conduit contained the conductive steel spiral, it was necessary to maintain a ground and electrically bond the metal in the conduit by use of a connector that had at least a metal ferrule which would be connected to the outlet box, panel, motor, etc.,by a metal body.

One version of the metal connector used a steel ferrule which covered the outside of the conduit and screwed into the inside of the conduit. It then worked in conjunction with a fitting and a nut to complete the assembly. Most brands also included a sealing gasket inside to insure a water tight assembly.

Most of the present art connectors for plastic conduit have a ferrule as part of the connector body. Most of these have no threads on the ferrule and they depend on a nut and one other clamping part to secure the cable.

Another connector has threads on the ferrule. However, on this product the threads terminate before going inside of the fitting. This fitting also uses a nut and a sealing gasket.

Another screw on connector is similar to the existing technology for die cast connectors for flexible metal conduit except that it is a molded plastic for use with non-metallic liquid tight (NMLT) conduit. This connector also employs a sealing gasket for the conduit to butt up against. The disadvantage of this product is that it will not work well unless the conduit is cut perfectly straight. It also does not have the finished appearance of most liquid tight fittings where the outside cut edge of the conduit is covered.

SUMMARY OF THE INVENTION

This invention provides an improved connector for attaching flexible non-metallic liquid tight conduit to electrical panels. The invention consists of a one piece connector, typically molded from thermoplastic, with a cylindrical inner body section, an integral ferrule, and a collar integral with and extending from the ferrule. The outer circumference of the inner body section has threads for grabbing the interior surface of the flexible non-metallic conduit and pulling it toward the integral ferrule. Once the inside surface of the flexible non-metallic conduit is captured by the threads, continued rotation of the connector with respect to the flexible conduit pulls the conduit into the channel between the integral collar and the inner body section. As the conduit advances into this space, a taper on the inner circumference of the collar causes the conduit to be compressed into the ever decreasing channel. As the conduit advances fully into the channel, the restricted area between the taper and the body of the connector compresses the end of the flexible conduit. After the conduit is tightened completely into the space between the inner body section and the collar, the compressed conduit is held firmly in place by the combined action of the compression forces and the gripping action of the threads that have imbedded themselves in the inner surface of the conduit. A liquid tight seal is thereby created between the connector and the conduit at the point where the integral collar joins the integral ferrule.

OBJECTS AND ADVANTAGES

A first object of the present invention is to provide a connector for attaching flexible non-metallic conduit to electrical devices that is simpler and easier to operate than present art connectors. For the present invention, just a simple rotation of the flexible conduit with respect to the connector while applying a firm force enables the conduit to be pulled into the connector and locked in a watertight relationship.

A second object of the invention is to provide a water tight connector for flexible non-metallic conduit that is cheap and easy to manufacture. The complete connector of the present invention is of one-piece molded plastic making it inexpensive and easy to manufacture.

Another object of the present invention is to eliminate the need for a separate gasket to create a liquid tight seal between the connector and the conduit. The present invention creates a liquid tight seal without the use of a gasket.

A further object is to provide a connector for flexible non-metallic liquid tight conduit that has strong pull out resistance. The flexible NMLT conduit is compressed between the inner body and the collar of the present invention and held firmly in place by the compressive forces and the gripping action of the threads on the inner circumference of the conduit.

A still further object is to create a connector that is self threading. The pitch and shape of the threads on the inner body portion of the present invention tend to create a pulling action on the conduit once the end of the end of the conduit is first rotated onto the end of the connector. With continued rotation of the conduit, the threads act to create a self threading action and thereby pull the conduit into the space between the inner body portion and the ferrule.

Other objects and advantages of the present invention will be better understood from the following description when read in conjunction with the appropriate drawings.

DESCRIPTION OF THE INVENTION

The present invention comprises a connector for attaching flexible non-metallic liquid tight (NMLT) conduit to electrical panels, outlet boxes, motors, and other electrical devices.

Figure 1:
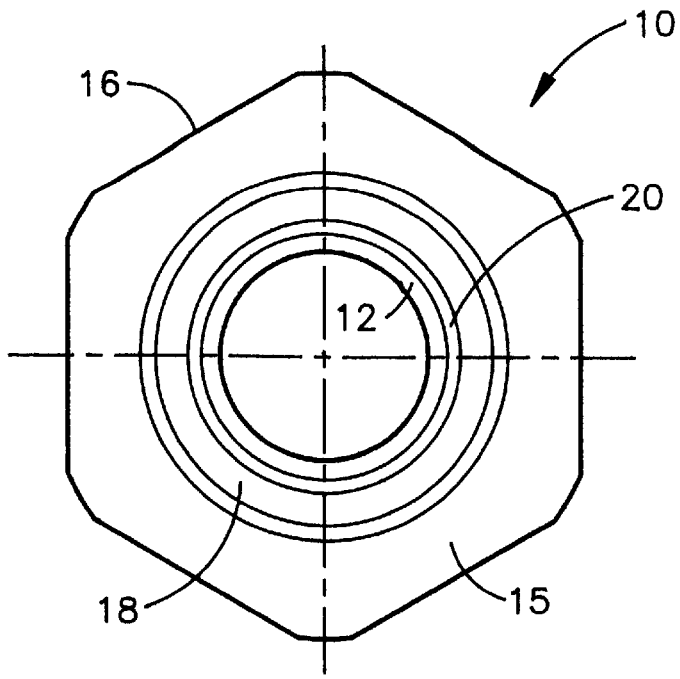
FIG. 1 is a top view of the connector showing the ferrule, outer hexagonal surface of the ferrule, the collar, and the inner body portion.

A top view of the connector 10 is shown in FIG. 1. The connector is typically molded from thermoplastic in one piece. The connector 10 has a cylindrical smooth surfaced inner body section 12 with conduit threads 20 extending from the outer circumference of the inner body. A ferrule 14 integral with the inner body section 12 has an integral collar 15 that surrounds the inner body section 12 and creates a circular channel 18 therebetween.

Figure 2:
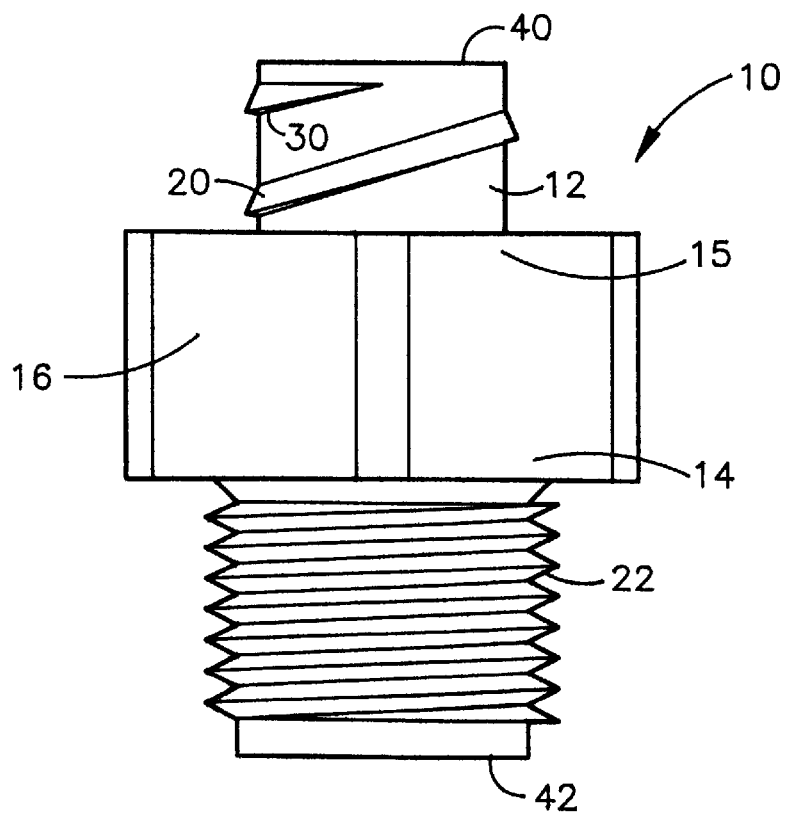
FIG. 2 is a side view of the connector of FIG. 1.

As shown in FIG. 2, the conduit threads 20 begin near the exterior end 40 of the connector 10 on the inner body section 12. The shape and pitch of the conduit threads are very critical as they create a pulling or self threading action on the flexible non-metallic liquid tight conduit that will be rotated firmly onto the end of the inner body section 12. The conduit threads 20 typically have a pitch of 5 threads per inch and an angle 30 of 10 degrees on the side of the threads away from the exterior end 40 of the connector. The angle of the conduit threads 20 on the side facing the exterior end 40 of the connector is approximately 60 degrees. The shape and pitch of the conduit threads 20 create the self threading action of the conduit on the inner body section 12. As shown in FIG. 2, the ferrule 14 has a hexagonal outer surface 16 to allow gripping the connector 10 with a wrench or similar tool. The outer circumference of the interior end 42 of the connector 10 has threads 22 to facilitate connection to an outlet box, electrical panel, motor, or any similar device.

Figure 3:
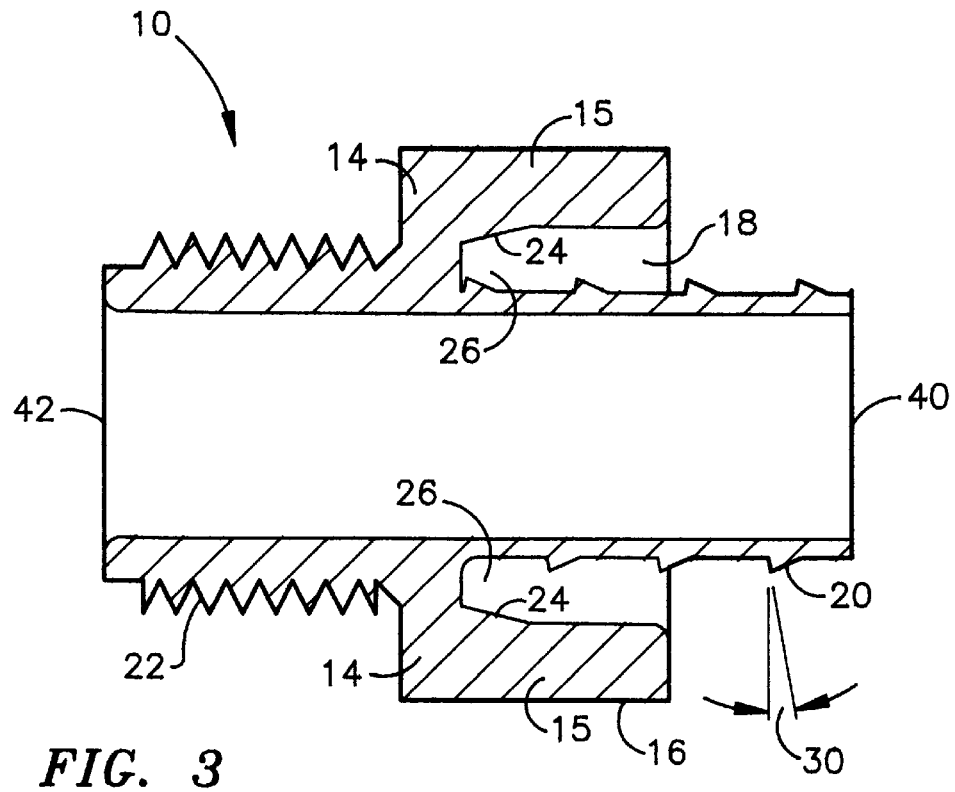
FIG. 3 is a sectional view from the side of the connector showing the inner body section, threads on the inner body section, the ferrule, the collar, and the annular channel between the inner body section and the collar including the tapered portion of the collar.

A cross sectional side view of the connector 10 in FIG. 3 depicts the channel 18 created between the inner body section 12 and the collar 15. The taper 24 on the interior surface of the collar 15 near the end of the channel 18 creates a restricted space 26 at the end of the channel.

Figure 4:
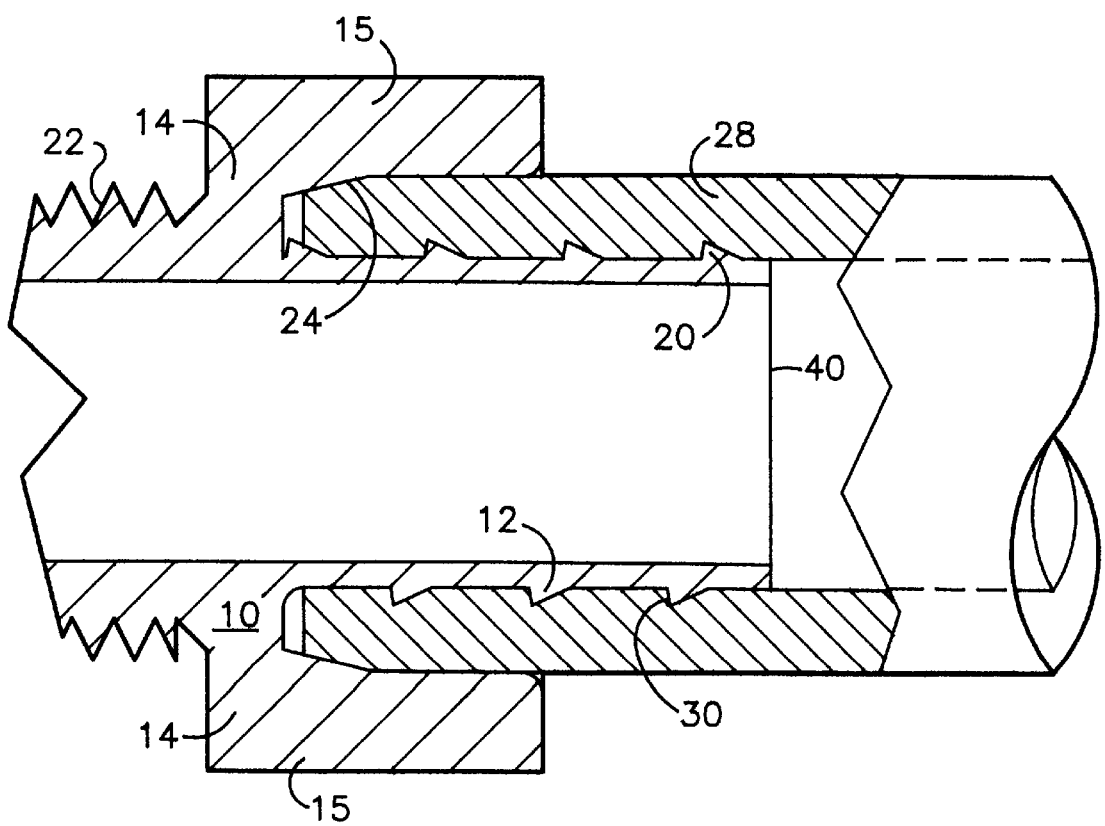
FIG. 4 is a sectional view from the side of the connector and depicting the flexible non-metallic liquid tight conduit fully tightened into the connector until a liquid tight seal is created and the conduit is strongly resistive to pull out forces.

FIG. 4 depicts a cross sectional side view of the connector 10 of the present invention with a flexible non-metallic liquid tight conduit 28 inserted fully therein. As the conduit 28 is contacted with the exterior end 40 of the connector and is firmly rotated against the inner body section 12 it begins to advance therewith on the outer circumference of the inner body section 12. The conduit threads 20 form a path or groove in the interior surface of the flexible non-metallic conduit 28. Further rotation of the conduit 28 with respect to the connector 10 causes further advancement of the conduit 28 along the inner body section 12. This advancing action of the conduit 28 is made easier by the action of the conduit threads 20 which by their shape and pitch tend to create a pulling action on the conduit 28.

To aid the entry of the conduit 28 into the channel 18, the outer diameter of the inner body section 12 is slightly less than the inner diameter of the conduit 28 and the inner diameter of the collar 15 is slightly greater than the outer diameter of the conduit. The outer diameter of the conduit threads 20 is greater than the inner diameter of the conduit 28 to enable the conduit threads 20 to dig into the inner wall of the conduit and create a pulling and guiding action as the conduit is rotated with a slight force onto the inner body section 12. As the inner diameter of the tapered surface 24 at the greatest point of taper is less than the outer diameter of the conduit 28, the inserted end of the conduit is thereby compressed inwardly toward the central axis of the connector and is forced against the conduit threads 20. In the compressed state, the conduit 28 forms a liquid tight seal between the connector and the conduit.

As the conduit 28 is advanced into the channel 18 it comes in contact on its outer circumferential end with the taper 24 on the inner surface of the ferrule 14. The taper 24 forces the end of the conduit 28 to compress and form a liquid tight seal. At this point the conduit 28 is advanced fully into the channel between the collar 15 and the inner body section 12 and is held firmly in place by the compression of the end of the conduit 28 against the conduit threads 20. After the conduit 28 is fully inserted into the connector 10 it is very resistant to being dislodged by a backwards pull force. The compression of the end of the conduit 28 also creates a liquid tight seal between the connector and the conduit.

Flexible liquid tight non-metallic conduit is typically made from co-extruded polyvinyl chloride. Usually it is a combination of rigid polyvinyl chloride co-extruded with flexible polyvinyl chloride.

Figure 5:
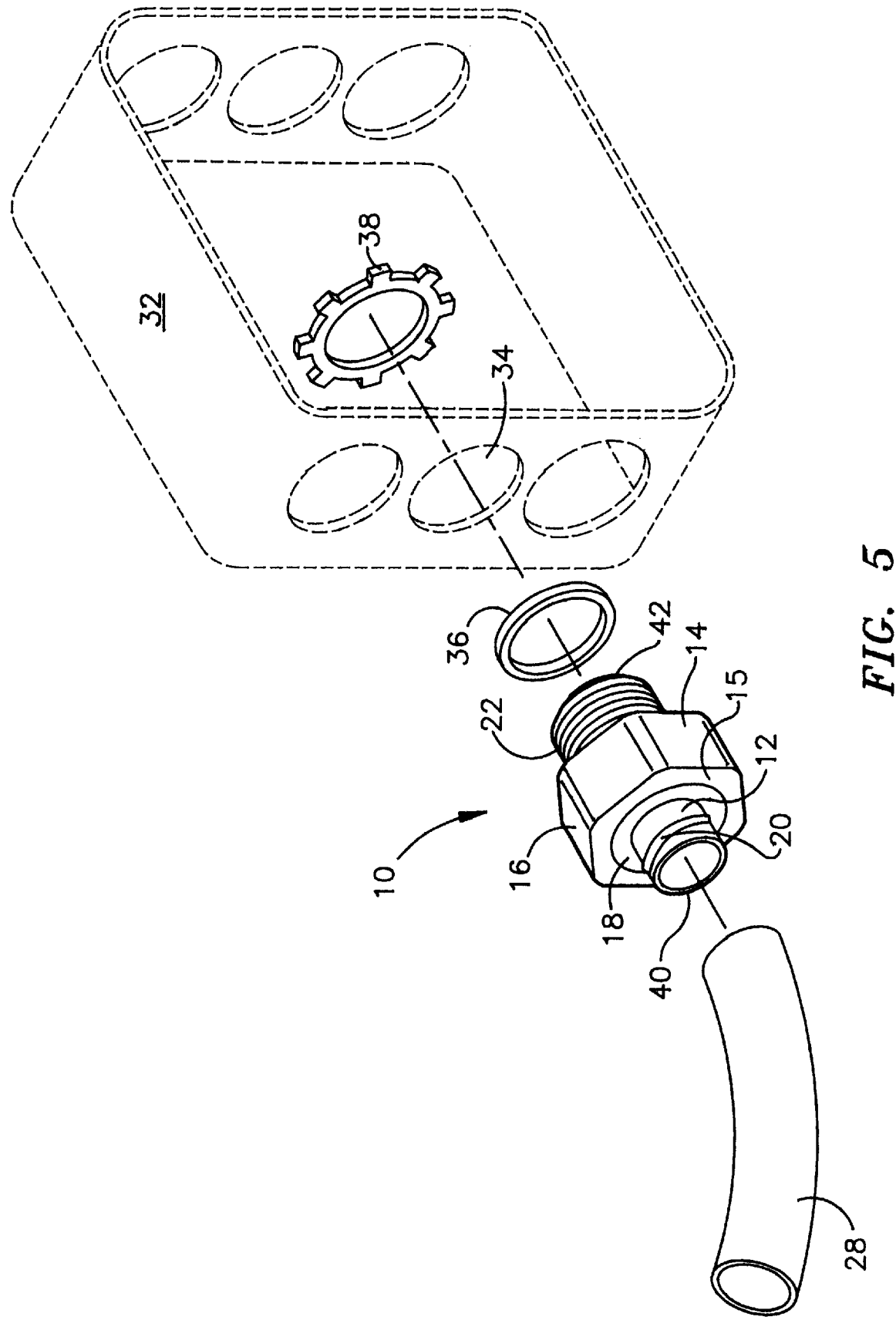
FIG. 5 is a perspective view of the connector, a flexible non-metallic conduit, an outlet box and a gasket and lock nut for affixing the connector to the outlet box as they would be aligned for completing an assembly of the present invention.

FIG. 5 shows an exploded perspective view of the various pieces that would be fitted together to attach the connector 10 of the present invention to a typical outlet box. From left to right in the perspective view are shown the conduit 28, connector 10, gasket 36, outlet box 32 and lock nut 38. A typical sequence of installing the connector 10 would include rotating the conduit 28 upon the inner body section 12 until the end of conduit 28 is locked in a compressed state within the channel 18 of the connector thereby creating a water tight seal between the connector 10 and the conduit 28, sliding a gasket 36 upon the threads 22 on the 42 insertion end of the connector 10, inserting the insertion end 42 of the connector 10 with the gasket 36 thereupon into a knock out or access hole 34 in an outlet box 32, and then attaching a lock nut 38 to the threads 22 on the insertion end of the connector 10 and tightening until a water tight seal is created by the compressed gasket 36 between the connector 10 and the exterior surface of the outlet box 32.

Having thus described the invention with reference to a preferred embodiment, it is to be understood that the invention is not so limited by the description herein but is defined as follows by the appended claims.

What is claimed is:

1. A one-piece water tight connector for flexible non-metallic conduit comprising:

a generally cylindrical inner body section with a smooth bore therethrough, said inner body section having an exterior end and an interior end and an outer surface;

an integral ferrule projecting out from said inner body section approximate the midpoint between said exterior and interior ends;

an integral collar extending from said ferrule toward said exterior end, said collar having an inner surface, said collar furthermore defining an annular channel between said inner surface of said collar and said outer surface of said inner body section;

integral threads extending from said outer surface of said inner body section, said threads of such a shape and pitch to create a pulling action on an appropriately sized flexible non-metallic conduit that is threaded thereon; and a tapered surface on said inner surface of said collar, said tapered surface located at the innermost end of said annular channel where said collar joins said ferrule, said tapered surface forcing any conduit guided therein by said annular channel and said threads to be compressed against said inner body section thereby creating a liquid tight seal.

2. The water tight connector of claim 1 wherein the outer diameter of said inner body section is slightly less than the inner diameter of the conduit, the inner diameter of said collar is slightly greater than the outer diameter of the conduit, the outer diameter of said threads is greater than the inner diameter of the conduit, and the inner diameter of said tapered surface at the greatest point of taper is less than the outer diameter of the conduit.

3. The water tight connector of claim 1 wherein said threads have a sharp slope on the side of the threads facing the interior end of said connector, said threads have a gradual slope on the side of the threads facing said exterior end of connector, and said threads have a pitch of about five threads per inch.

4. A one-piece water tight connector for flexible non-metallic conduit comprising:

a generally cylindrical inner body section with a smooth bore therethrough, said inner body section having an exterior end and an interior end and an outer surface;

an integral ferrule projecting out from said inner body section approximate the midpoint between said exterior and interior ends;

an integral collar extending from said ferrule toward said exterior end, said collar having an inner surface, said collar furthermore defining an annular channel between said inner surface of said collar and said outer surface of said inner body section;

integral threads extending from said outer surface of said inner body section, said threads of such a shape and pitch to create a pulling action on an approximately sized flexible non-metallic conduit that is threaded thereon; and a tapered surface located at the innermost end of said annular channel, said tapered surface forcing any conduit guided therein by said annular channel and said threads to be compressed into the innermost end of said annular channel thereby creating a liquid tight seal.

* * * * *